(12) United States Patent
Henry

(10) Patent No.: US 10,244,673 B2
(45) Date of Patent: Apr. 2, 2019

(54) AGRICULTURAL AIR CART BLOWER FAN ARRANGEMENT

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/251,437

(22) Filed: Aug. 30, 2016

(65) Prior Publication Data

US 2018/0054956 A1    Mar. 1, 2018

(51) Int. Cl.
*A01C 7/08*    (2006.01)
*A01C 15/04*   (2006.01)

(52) U.S. Cl.
CPC .............. *A01C 7/082* (2013.01); *A01C 15/04* (2013.01)

(58) Field of Classification Search
CPC ........... A01C 7/08; A01C 7/081; A01C 7/082; A01C 15/04; A01C 15/00; B65G 53/58; B65G 53/14
USPC ............... 111/174; 198/638, 406; 406/93, 94
See application file for complete search history.

(56) References Cited

U.S. PATENT DOCUMENTS

| | | | | |
|---|---|---|---|---|
| 1,385,261 A | * | 7/1921 | Muntz | F04D 23/003 406/101 |
| 4,176,798 A | * | 12/1979 | Talbott | B02C 19/06 241/39 |
| 4,240,244 A | * | 12/1980 | Martin | A01D 43/14 241/166 |
| 4,563,123 A | * | 1/1986 | Beck | B04C 1/00 406/93 |
| 4,695,206 A | * | 9/1987 | Hansen | B65G 53/4641 406/105 |
| 4,865,722 A | | 9/1989 | Ririe et al. | |
| 4,914,896 A | | 4/1990 | Gullickson | |
| 5,061,299 A | * | 10/1991 | Porter, III | B01D 53/74 55/317 |

(Continued)

FOREIGN PATENT DOCUMENTS

CA    2905177 A1 *  5/2016  ............. F04D 25/04

OTHER PUBLICATIONS

"Selecting Fans and Determining Airflow for Drying, Cooling and Storage", William F. Wilcke and R. Vance Morey, University of Minnesota Extension, Dec. 31, 2002 (16 pages).

(Continued)

*Primary Examiner* — Christopher J. Novosad
(74) *Attorney, Agent, or Firm* — Rebecca L. Henkel; Richard K. DeMille

(57) ABSTRACT

An agricultural implement comprising a chassis, a plurality of wheels coupled to the chassis, and a pneumatic distribution system coupled to the chassis, the pneumatic distribution system including at least one tank capable of storing and releasing agricultural product; a metering arrangement including conduit capable of transporting the agricultural product; and a blower fan arrangement configured to transport the agricultural product, the blower fan arrangement including a first blower fan and a second blower fan, each blower fan having an air inlet and an air outlet, and a transition section fluidly coupling the air outlet of the first blower fan with the air inlet of the second blower fan.

10 Claims, 2 Drawing Sheets

(56) References Cited

U.S. PATENT DOCUMENTS

| | | | |
|---|---|---|---|
| 5,429,250 | A | 7/1995 | Dobson et al. |
| 7,731,578 | B2 | 6/2010 | Birrell et al. |
| 7,743,593 | B2 | 6/2010 | Owen |
| 7,946,368 | B2 | 5/2011 | Vandike et al. |
| 8,347,522 | B2 | 1/2013 | Dyson et al. |
| 8,370,000 | B2 | 2/2013 | Riegler |
| 2011/0139050 | A1 | 6/2011 | Lewis |
| 2012/0085836 | A1 | 4/2012 | Tiu et al. |
| 2013/0055893 | A1 | 3/2013 | Lowe et al. |
| 2016/0178237 | A1* | 6/2016 | Giaretta ................. F24H 3/087 126/90 R |
| 2017/0079198 | A1* | 3/2017 | Borkgren ............... B65G 53/04 |

OTHER PUBLICATIONS

"Electronics Cooling: All you need to know about fans", Mike Turner and Comair Rotron, Oct. 29, 2002 (8 pages).
"Using fans in series and parallel: performance guidelines", Gareth Jones, EBM-Papst, May 10, 2013 (3 pages).
"Multiple Fan Systems—Fans in Series and Parallel", ACHR News, Jan. 21, 2008 (14 pages).

\* cited by examiner

AGRICULTURAL AIR CART BLOWER FAN ARRANGEMENT

BACKGROUND OF THE INVENTION

1. Field of the Invention

The present invention relates to agricultural air carts, and, more particularly, to a pneumatic distribution system used with such agricultural air carts.

2. Description of the Related Art

Air carts are commonly used in agricultural applications. They are often towed behind an agricultural tilling implement, which in turn is towed behind an agricultural vehicle such as a tractor. The primary function of the air cart is to supply agricultural products such as seed, fertilizer, and/or herbicide to the tilling implement and subsequently to the field.

Air carts generally include a metering system for dispensing material from one or more tanks and a pneumatic distribution system for delivering the material from the tank or tanks to the soil. In the case of multiple tanks, the tanks can be separate tanks, or a single tank with internal compartments. A centrifugal fan provides at least one airstream which flows through the pneumatic distribution system. Material is first introduced to the air stream by the metering system at a primary distribution manifold located below the metering system. Material is carried by the air stream through distribution lines to a series of secondary distribution manifolds, which in turn distribute the material through distribution lines to ground openers on the implement so that the product may be evenly delivered to the ground.

For initial hookup of the air seeder, the agricultural vehicle is typically backed up to and coupled with the tilling implement, which in turn is backed up to and coupled with the air cart (e.g., by using respective hitch pins or the like, and assuming that the air cart is behind rather than in front of the air drill). All necessary fluid lines and electrical connections are then connected between the agricultural vehicle, tilling implement and air cart. For example, it may be necessary to connect hydraulic lines, air lines, electrical power lines and/or electrical data lines between the pieces of equipment.

With tilling implements becoming ever larger, the number of air lines and thus the number of air line connections between the tilling implement and the air cart correspondingly increases, thereby requiring that the pneumatic distribution system run under a higher operating pressure. Larger and larger blower fans have been used, but there is a limit as to both the size of the fan and the capacity of the hydraulic system to handle them. In addition, a larger fan may increase the air flow, but may not increase the pressure delivered.

What is needed in the art is an air cart with a pneumatic distribution system to efficiently accommodate very large tillage implements.

SUMMARY OF THE INVENTION

The present invention provides an improved pneumatic distribution system for an agricultural implement, wherein two blower fans are coupled together by a transition section, the air output of one fan becoming the air input of the other fan.

The present invention in one form is directed to an agricultural implement comprising a chassis, a plurality of wheels coupled to the chassis, and a pneumatic distribution system coupled to the chassis, the pneumatic distribution system including at least one tank capable of storing and releasing agricultural product, a metering arrangement including conduit capable of transporting the agricultural product, and a blower fan arrangement configured to transport the agricultural product, the blower fan arrangement including a first blower fan and a second blower fan, each blower fan having an air inlet and an air outlet, and a transition section fluidly coupling the air outlet of the first blower fan with the air inlet of the second blower fan.

The present invention in another form is directed to a pneumatic distribution system capable of distributing an agricultural product, the pneumatic distribution system comprising at least one tank capable of storing and releasing the agricultural product, a metering arrangement including conduit capable of transporting the agricultural product, and a blower fan arrangement configured to transport the agricultural product, the blower fan arrangement including a first blower fan and a second blower fan, each blower fan having an air inlet and an air outlet, and a transition section fluidly coupling the air outlet of the first blower fan with the air inlet of the second blower fan.

An advantage of the present invention is a nearly doubling of air pressure and the amount of agricultural product delivered to a tilling implement.

Another advantage of the present invention is the air temperature in the pneumatic distribution system is increased, thereby decreasing the humidity and increasing the efficiency of the air distribution system.

Another advantage of the present invention is two remotes can be used in the tractor, thereby relieving the load of a single remote system.

Still another advantage of the present invention is the low costs associated with the invention.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, and such an exemplification is not to be construed as limiting the scope of the invention in any manner.

DETAILED DESCRIPTION OF THE INVENTION

Figure 1:
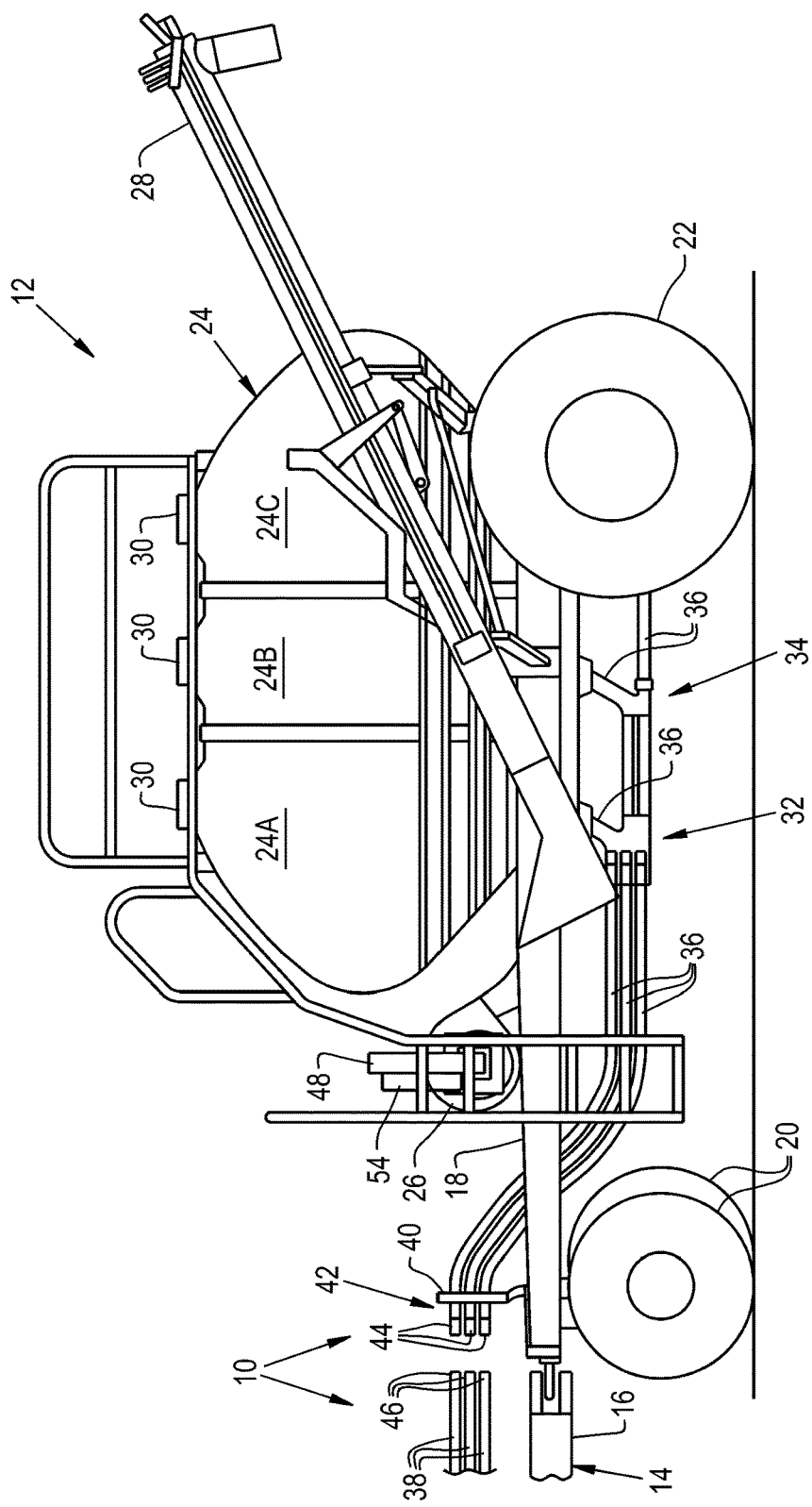
FIG. 1 is a side view of a portion of an exemplary agricultural seeding or fertilizing system of the present invention.

Referring now to FIG. 1, there is shown an illustration of a portion of an exemplary agricultural seeding or fertilizing system 10 according to the present invention. Agricultural seeding or fertilizing system 10 generally includes an air cart 12 and a tilling implement 14 (with only the rear hitch 16 of tilling implement 14 shown). Air cart 12 may also be configured with a rear hitch (not shown) allowing air cart 12 to be towed in front of, rather than behind, tilling implement 14.

Air cart 12 generally includes a frame 18 which carries steerable front wheels 20, rear wheels 22, tank 24, blower fan arrangement 26, and auger 28. Tank 24 is illustrated as a multi-compartment tank with internal divider walls (not shown) separating the compartments. In the embodiment shown, tank 24 has three compartments 24A, 24B and 24C with each compartment containing a material to be deposited into the soil (such as seed, fertilizer, herbicide and/or insecticide). Each compartment 24A, 24B and 24C has a top hatch 30 allowing loading of the material therein. In other embodiments not shown, air cart 12 may include multiple tanks 24.

Air cart 12 further includes a pneumatic distribution system 32 for delivering the agricultural material to the trenches in the soil formed by tilling implement 14. Pneumatic distribution system 32 includes a metering system 34 (not specifically shown), blower fan arrangement 26, and a plurality of air lines 36. In the illustrated embodiment, three primary air lines 36 are shown, one from each tank compartment 24A, 24B and 24C. However, the number of air lines 36 can vary, depending upon the application.

Air lines 36 extend to and terminate at a convenient location for coupling with air lines 38 associated with tilling implement 14. In the embodiment shown, air lines 36 are supported at the forward end of air cart 12 with a support yoke 40. Each air line 36 terminates at a respective fluid (air) line connection 42. In the embodiment shown, each fluid line connection 42 includes a female connector 44 associated with each air line 36 and a male connector 46 associated with an end of each air line 38. However, the orientation of each fluid line connection 42 may be reversed such that each female connector 44 is associated with a corresponding air line 38 of tilling implement 14. Each male connector 46 is received within and fluidly seals with a respective female connector 44.

During use, tilling implement 14 is backed up to air cart 12 and mechanically hitched together. Fluid line connections 42 between mating air lines 36, 38 are made by inserting male connectors 46 into respective female connectors 44. Each fluid line connection 42 is then latched together using a suitable latch. Other appropriate connections are also made between tilling implement 14 and air cart 12, such as hydraulic and/or electrical connections (not shown). Agricultural seeding or fertilizing system 10 may then be used to deposit material into the trenches formed by tilling implement 14.

Figure 2:
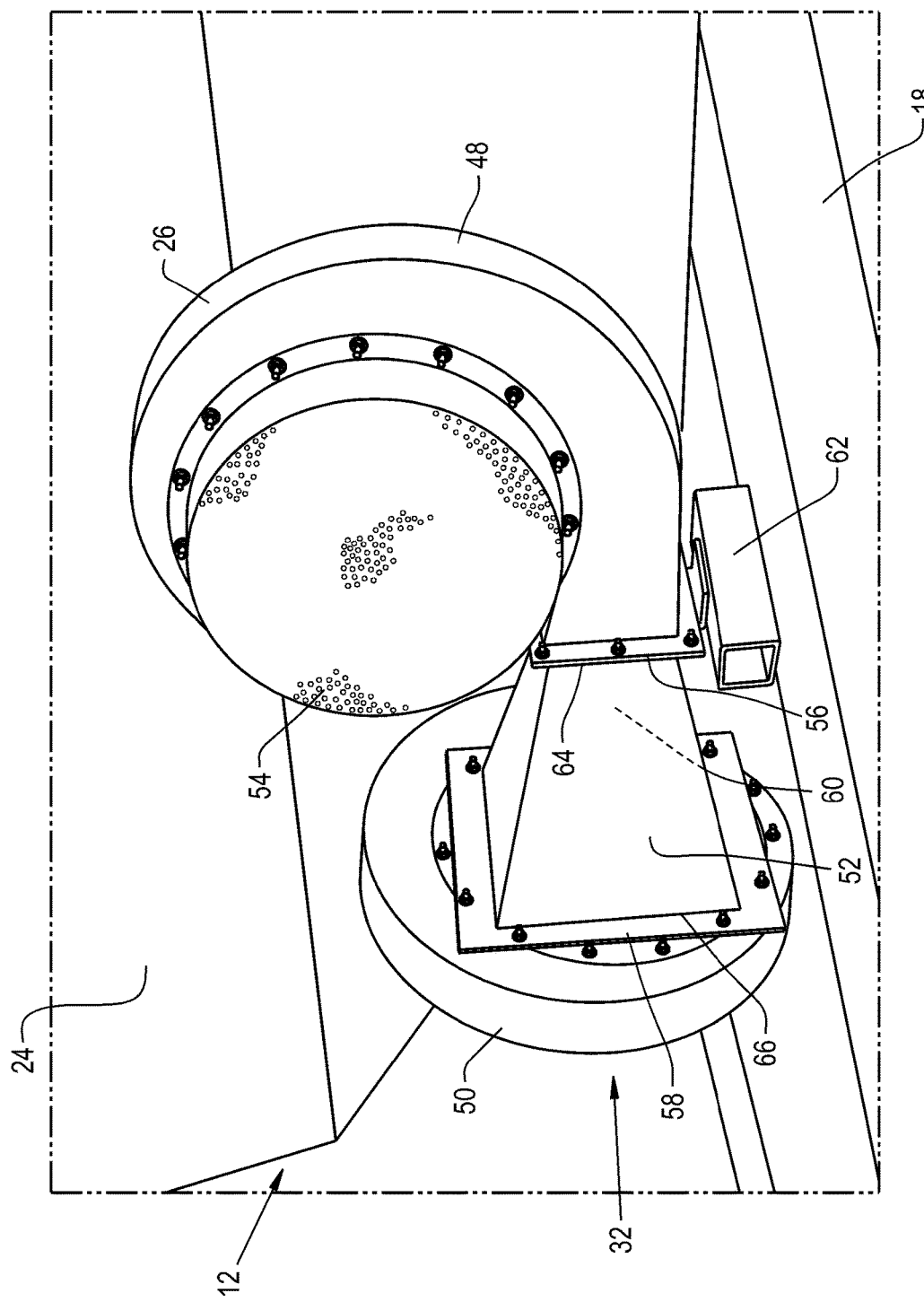
FIG. 2 is a perspective view of the blower fan arrangement of the agricultural seeding or fertilizing system of FIG. 1.

Now referring to FIG. 2 with continued reference to FIG. 1, the inventive blower fan arrangement 26 of pneumatic distribution system 32 is described. Blower fan arrangement 26 includes first blower fan 48, second blower fan 50, and transition section 52. First blower fan 48 includes air inlet 54 and air outlet 56, and second blower fan 50 includes air inlet 58 and an air outlet 60. In the inventive and advantageous embodiment shown, air outlet 56 of first blower fan 48 is coupled to air inlet 58 of second blower fan 50 by way of transition section 52.

Transition section 52 includes inlet end 64 and outlet end 66, and is generally pyramid-shaped with a truncated inlet 64 end smaller than the outlet end 66. Transition section 52 has a generally rectangular-shaped cross-section of inlet end 64, and a generally square-shaped cross-section of outlet end 66.

In operation, blower fan arrangement 26 uses first blower fan 48, transition section 52, and second blower fan 50 to produce a single source of air for the pneumatic distribution system 32. That is, ambient air is drawn into air inlet 54 of first blower fan 48, discharged from air outlet 56 of first blower fan 48 into inlet end 64 of transition section 52, discharged from outlet end 66 of transition section 52 into air inlet 58 of second blower fan 50, then discharged from air outlet 60 of second blower fan 50 to be used by pneumatic distribution system 32 in the transport of agricultural material such as seed, fertilizer, or herbicide. This advantageous arrangement provides increased airflow and pressure. Further, the operating air is at an elevated temperature as a result of being processed by the two blower fans.

Blower fan arrangement 26 may be removably attached directly to air cart frame 18, or to a separate mounting fixture 62 which in turn is attached to air cart frame 18. Blower fan arrangement 26 can be controlled by an operator by a single remote in the agricultural vehicle, or the two blower fans can each be controlled separately.

While an improved pneumatic distribution system has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement, comprising:
   a chassis;
   a plurality of wheels coupled to the chassis; and
   a pneumatic distribution system coupled to the chassis, the pneumatic distribution system including:
   at least one tank capable of storing and releasing agricultural product;
   a metering arrangement including conduit capable of transporting the agricultural product; and
   a blower fan arrangement configured to transport the agricultural product, the blower fan arrangement including a first blower fan and a second blower fan, each blower fan having an air inlet and an air outlet, and a transition section fluidly coupling the air outlet of the first blower fan with the air inlet of the second blower fan,
   wherein the transition section includes an inlet end and an outlet end, and is generally pyramid-shaped with a truncated inlet end smaller than the outlet end, and
   wherein the transition section has a generally square-shaped cross-section of the outlet end.

2. The agricultural implement of claim 1, wherein the pneumatic distribution system is operated by a single control for both blower fans.

3. The agricultural implement of claim 1, wherein the pneumatic distribution system is operated by a control for each blower fan.

4. A pneumatic distribution system capable of distributing an agricultural product, the pneumatic distribution system comprising:
   at least one tank capable of storing and releasing the agricultural product;
   a metering arrangement including conduit capable of transporting the agricultural product; and
   a blower fan arrangement configured to transport the agricultural product, the blower fan arrangement including a first blower fan and a second blower fan, each blower fan having an air inlet and an air outlet, and a transition section fluidly coupling the air outlet of the first blower fan with the air inlet of the second blower fan, wherein the pneumatic distribution system is operated by a control for each blower fan.

5. The pneumatic distribution of claim 4, wherein the transition section includes an inlet end and an outlet end, and is generally pyramid-shaped with a truncated inlet end smaller than the outlet end.

6. The pneumatic distribution of claim 5, wherein the transition section has a generally square-shaped cross-section of the outlet end.

7. The pneumatic distribution of claim 5, wherein the transition section has a generally rectangular-shaped cross-section of the inlet end.

8. An agricultural implement, comprising:
a chassis,
a plurality of wheels coupled to the chassis; and
a pneumatic distribution system coupled to the chassis, the pneumatic distribution system including:
   at least one tank capable of storing and releasing agricultural product;
   a metering arrangement including conduit capable of transporting the agricultural product; and
   a blower fan arrangement configured to transport the agricultural product, the blower fan arrangement including a first blower fan and a second blower fan, each blower fan having an air inlet and an air outlet, and a transition section fluidly coupling the air outlet of the first blower fan with the air inlet of the second blower fan,
wherein the transition section includes an inlet end and an outlet end, and is generally pyramid-shaped with a truncated inlet end smaller than the outlet end, and
wherein the transition section has a generally rectangular-shaped cross-section of the outlet end.

9. The agricultural implement of claim 8, wherein the pneumatic distribution system is operated by a single control for both blower fans.

10. The agricultural implement of claim 8, wherein the pneumatic distribution system is operated by a control for each blower fan.

* * * * *